J. T. JONES.
METHOD OF TREATING IRON ORE.
APPLICATION FILED JAN. 18, 1909.
930,764.
Patented Aug. 10, 1909.
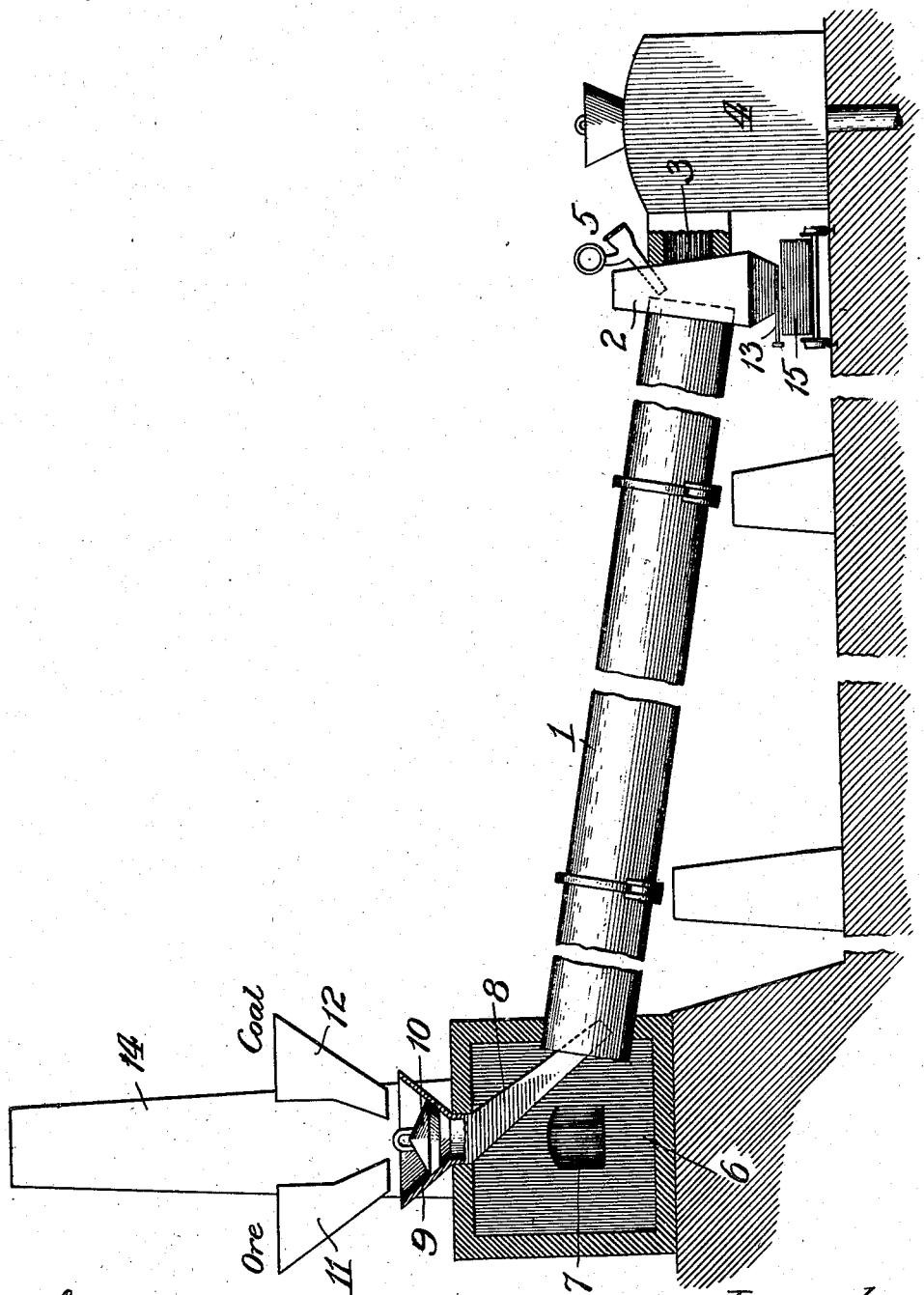
Witnesses:
John Enders
Chas. H. Buell
Inventor:
John T. Jones,
By Dyrenforth, Lee, Chritton & Wiles
Attys

UNITED STATES PATENT OFFICE.

JOHN T. JONES, OF IRON MOUNTAIN, MICHIGAN, ASSIGNOR TO JONES STEP-PROCESS COMPANY, OF DULUTH, MINNESOTA, A CORPORATION OF MINNESOTA.

METHOD OF TREATING IRON ORE.

No. 930,764.  Specification of Letters Patent.  Patented Aug. 10, 1909.

Application filed January 18, 1909. Serial No. 473,003.

*To all whom it may concern:*

Be it known that I, JOHN T. JONES, a citizen of the United States, residing at Iron Mountain, in the county of Dickinson and State of Michigan, have invented a new and useful Improvement in Method of Treating Iron Ore, of which the following is a specification.

My invention relates to an improved method of treating oxid of iron ores for the purpose of metallizing the oxid constituents and causing them to agglomerate and thus become isolated from the slag-making constituents, thereby converting the ore into sponge for subsequent treatment, under higher temperature, wherein the metallic iron and slag-making constituents are separated.

In carrying out my invention I prefer to employ a furnace, in the form of an inclined rotary tube lined throughout with fire-brick, or the like refractory material, and a gas-producer which generates and discharges hot reducing-gas into the lower end of the tube. Interposed between the gas-producer and tube is a stationary discharge-hopper in which the tube fits and rotates at its lower end. The tube at its upper end rotates in a chamber communicating with a chimney. Extending through the said chamber is a feed-chute into which ore and coal supplying hoppers discharge.

The natural temperature of the gas, from the gas-producer entering the lower end of the furnace or the tube, is approximately 1200° F. A controlled quantity of air is admitted into the tube with the gas and while this lowers the reducing quality of the gas-mixture, it raises the temperature thereof to, say, from 2000° F. to 2200° F. The gaseous mixture passes entirely through the tube and discharges into the chimney. The ore to be treated is preferably crushed, if necessary, to say, from one-quarter to one-half inch mesh, and is fed with a limited quantity of coal, which may also be preliminarily crushed, into the upper end of the rotating tube. When employing bituminous coal, I prefer to feed, say, five hundred pounds thereof to each ton of ore, feeding the ore and coal in a manner to cause them to mix more or less intimately as they descend into the tube. In the rotation of the inclined tube the ore and coal mixture is moved gradually downward toward the lower end of the furnace, the speed of movement being governed by the speed of rotation of the tube.

My present invention lies in introducing bituminous coal or the like carbonaceous material, with the ore, in a loose state, into the upper or feed end of the furnace, to enhance the reducing atmosphere above that part of the tube where final, or approximately complete, reduction of the iron oxids occurs, and then subjecting the reduced ore to a gradually increasing and non-oxidizing temperature, reaching a point approximately wherein the slag-making constituents become viscous or plastic and run together as they separate in the mass from the reduced iron constituent. As the ore and coal mixture passes through the upper part of the tube it is subjected to a more or less gradually increasing temperature commencing, say, at about 600° F., and increasing until the volatiles in the coal are burned out, combustion being supported by the oxygen freed from the ore. This reduction becomes complete before the ore reaches a temperature at which it will melt as an oxid and before the slag-making constituents become viscous or pasty to any material extent. Reduction of the iron oxids may be said to be complete in the furnace when the ore in a reducing atmosphere reaches a temperature of, say, between 1400° F. and 1500° F. If the ore were then brought into contact with atmospheric air it would oxidize very rapidly. I have found that by subjecting the ore after reduction to a non-oxidizing atmosphere of gradually increasing temperature, reaching a final heat of from 2000° F. to 2200° F., the iron becomes fixed in its metallized state and will not readily oxidize when brought into contact with atmospheric air. This temperature is insufficient to render the slag-making constituents fluid, so that the mass is discharged from the lower end of the furnace in the form of sponge. The sponge may be allowed to cool or it may be treated immediately in an open hearth, balling or other furnace, to free the metal from the slag.

In the accompanying drawing I show, for purposes of illustration, apparatus suitable for carrying out my improved method; the view being partly in elevation, partly in section, and diagrammatic in its nature.

The figure shows the furnace or tube 1 in side elevation, mounted upon supports to rotate. The means for rotating the tube are not illustrated. At the lower end of the tube is a stationary discharge-hopper 2, having a valve 13 at its lower end. The hopper 2 fits approximately gas-tight around the tube and around the discharge-mouth 3 of a gas-producer 4. Entering the hopper 2 and discharging in the direction of the lower end of the tube is a twyer 5, or other form of controllable air-inlet. The gas from the gas-producer has a natural temperature approximating 1200° F. Sufficient air is admitted through the twyer 5 to promote combustion of the producer-gas and raise it to a temperature of, say, 2200° F. The oxygen of the air admitted at the twyer will be taken up by the producer-gas and the hot atmosphere moving upward in the furnace will still be of a more or less reducing nature. The upper end of the furnace or tube rotates in a stationary chamber 6 having an outlet 7 to a chimney 14. Passing through the chamber 6 is a feed-chute 8 having a hopper-top 9 and closed by a bell-valve 10. Discharging into the hopper 8 are the chutes 11 and 12, one for ore and the other for coal.

Coal and ore are discharged simultaneously into the hopper 9 in proportions of, say, five hundred pounds of coal to the ton of ore, though these proportions may be varied as desired. When the bell-valve 10 is lifted, the ore and coal mixing together as they descend, fall into the upper end of the furnace where the mixture is subjected to a temperature of, say, from 600° F. to 700° F. In the rotation of the furnace the mass is moved slowly downward, the coal being ignited and taking up the oxygen from the ore. Combustion of the coal is completed, in practice, when the mass has moved, say, one-third of the distance down the tube, and the absorption of the oxygen of the ore in supporting combustion of the fuel, and the further absorption thereof by the hot reducing-gas, passing across and through the mass from the lower end of the tube, completes reduction of the ore when it has reached approximately the middle of the tube. From there on, the ore is subjected to a gradually increasing temperature, in a non-oxidizing atmosphere, until it approximates, say, 2000° F., and is discharged into the hopper 2. As preferably none of the constituents of the ore is rendered more than viscous or pasty before being discharged, the spongy product will not adhere to the wall of the tube, at least not to an extent which renders its removal difficult to accomplish.

Beneath the hopper 2 is a track on which cars 15 may be run to receive the product when the valve 13 is opened.

What I claim as new and desire to secure by Letters Patent is—

1. The method of treating iron-ore, which consists in mixing carbonaceous material therewith, then advancing the mixture through a highly heated non-oxidizing atmosphere, to consume the carbonaceous material and support its combustion with oxygen from the ore, thus reducing the ore, then advancing the reduced mass through a still more highly heated non-oxidizing atmosphere to fix the metal constituent without melting the slag-making constituents.

2. The method of treating iron-ore, which consists in mixing carbonaceous material therewith, then advancing the mixture through a highly heated non-oxidizing atmosphere, to consume the carbonaceous material and support its combustion with oxygen from the ore, thus reducing the ore, then advancing the reduced mass through a non-oxidizing atmosphere of gradually-increasing temperature approximating without reaching the melting point of the slag constituents.

JOHN T. JONES.

In the presence of—
C. T. WINEGAR,
W. G. JONES.